United States Patent
Cosack et al.

(10) Patent No.: US 10,288,037 B2
(45) Date of Patent: May 14, 2019

(54) METHOD FOR CONTROLLING A ROTATIONAL SPEED THRESHOLD OF A WIND TURBINE, AND A CORRESPONDING WIND TURBINE

(71) Applicant: SENVION GMBH, Hamburg (DE)

(72) Inventors: Nicolai Cosack, Hannover (DE); Christian Beckmann, Münster (DE)

(73) Assignee: SENVION GMBH, Hamburg (DE)

( * ) Notice: Subject to any disclaimer, the term of this patent is extended or adjusted under 35 U.S.C. 154(b) by 1088 days.

(21) Appl. No.: 14/346,976

(22) PCT Filed: Oct. 4, 2012

(86) PCT No.: PCT/EP2012/069667
§ 371 (c)(1),
(2) Date: Mar. 25, 2014

(87) PCT Pub. No.: WO2013/050502
PCT Pub. Date: Apr. 11, 2013

(65) Prior Publication Data
US 2015/0050145 A1    Feb. 19, 2015

(30) Foreign Application Priority Data
Oct. 5, 2011   (DE) .................. 10 2011 054 211

(51) Int. Cl.
*F03D 7/02*   (2006.01)
*F03D 7/04*   (2006.01)
*F03D 9/25*   (2016.01)

(52) U.S. Cl.
CPC ......... *F03D 7/0244* (2013.01); *F03D 7/0224* (2013.01); *F03D 7/0264* (2013.01);
(Continued)

(58) Field of Classification Search
CPC .... F03D 7/0224; F03D 7/0244; F03D 7/0264; F03D 7/04; F03D 9/255; F05B 2270/3201; Y02E 10/723
(Continued)

(56) References Cited

U.S. PATENT DOCUMENTS 4,297,076 A * 10/1981 Donham ............... F03D 7/0228
416/24
7,745,949 B2 * 6/2010 Yang ..................... H02P 9/009
290/44
(Continued)

FOREIGN PATENT DOCUMENTS

CN   101566128 A   10/2009
CN   103857905 A   6/2014
(Continued)

OTHER PUBLICATIONS

International Search Report and Written Opinion dated Apr. 1, 2013 by the International Searching Authority for Application No. PCT/EP2012/069667 dated Oct. 4, 2012 and published as WO 2013/050502 dated Apr. 11, 2013 (Applicant—Kenersys GMBH et al ) (Original—7 pages // Translated—6 pages).
(Continued)

*Primary Examiner* — Mark A Laurenzi
*Assistant Examiner* — Paul Thiede
(74) *Attorney, Agent, or Firm* — Ballard Spahr LLP

(57) ABSTRACT

The invention relates to a method for operating a wind turbine (10) comprising a rotor (12) and a generator (18), connected to said rotor (12), for outputting electrical power to an electrical grid, said rotor (12) comprising rotor blades (14) whose blade pitch angles (α) may be moved during operation in order to control the rotational speed (n) of the rotor (12). Upon reaching a rotational speed (n) higher than a rotational speed limit ($n_{lim}$) that delimits an operational
(Continued)

range (34, 34', 34") of said wind turbine (10), the rotor (12) is forcibly braked by increasing the blade pitch angle ($\alpha$) at a predefined positive blade pitch angle movement rate ($\omega_r$). According to the invention, the rotational speed limit ($n_{lim}$) is altered as a function of a blade pitch angle movement rate ($\omega$) set by the control. The invention also relates to a corresponding wind turbine (10).

17 Claims, 2 Drawing Sheets

(52) U.S. Cl.
CPC .............. *F03D 7/04* (2013.01); *F03D 9/255* (2017.02); *F05B 2270/3201* (2013.01); *Y02E 10/723* (2013.01)

(58) Field of Classification Search
USPC ........................................ 415/23; 290/44, 55
See application file for complete search history.

(56) References Cited

U.S. PATENT DOCUMENTS

| | | | | |
|---|---|---|---|---|
| 8,143,734 | B2* | 3/2012 | Steudel | ................ F03D 7/0224 290/43 |
| 2007/0216166 | A1* | 9/2007 | Schubert | ............... F03D 7/0224 290/55 |
| 2009/0224543 | A1 | 9/2009 | Steudel et al. | |
| 2009/0243295 | A1* | 10/2009 | Kammer | ............... F03D 7/0224 290/44 |
| 2011/0084485 | A1 | 4/2011 | Miranda et al. | |
| 2011/0175356 | A1* | 7/2011 | Nielsen | ................. F03D 7/0296 290/44 |
| 2012/0187684 | A1* | 7/2012 | Kawas | .................... F03D 7/026 290/44 |
| 2015/0050145 | A1 | 2/2015 | Cosack et al. | |

FOREIGN PATENT DOCUMENTS

| | | |
|---|---|---|
| DE | 102004054608 A1 | 3/2006 |
| DE | 102006001613 A1 | 7/2007 |
| DE | 102007014863 A1 | 10/2008 |
| DE | 102007035724 A1 | 2/2009 |
| DE | 102008012957 A1 | 9/2009 |
| DE | 102009057062 A1 | 6/2011 |
| DE | 102010051746 A1 | 6/2011 |
| DE | 102011054211 B3 | 1/2013 |
| EP | 2098725 A2 | 9/2009 |
| EP | 2764239 A1 | 8/2014 |
| IN | 2928DEN2014 A | 5/2015 |
| WO | WO-2013/050502 A1 | 4/2013 |

OTHER PUBLICATIONS

First Office Action dated Mar. 29, 2016 by SIPO for CN Application No. 201280049260.7, which was filed on Oct. 4, 2012 and published as CN103857905A dated Jun. 11, 2014 (Applicant—Kenersys GMBH)(Original—5 pages // Translated—7 pages).

Second Office Action dated Nov. 2, 2016 by SIPO for CN Application No. 201280049260.7, which was filed on Oct. 4, 2012 and published as CN103857905A dated Jun. 11, 2014 (Applicant—Kenersys Gmbh)(Original—3 pages // Translated—5 pages).

* cited by examiner

METHOD FOR CONTROLLING A ROTATIONAL SPEED THRESHOLD OF A WIND TURBINE, AND A CORRESPONDING WIND TURBINE

CROSS REFERENCE TO RELATED APPLICATIONS

The present application is a National Phase Application of International Application No. PCT/EP2012/069667, filed Oct. 4, 2012, which claims priority to German Patent Application No. 10 2011 054 211.6, filed Oct. 5, 2011, which applications are incorporated herein fully by this reference.

FIELD

The present invention relates to a method for operating a wind turbine having a rotor and a generator connected to the rotor for outputting electrical power to an electrical grid. The aforementioned rotor includes rotor blades, whose blade pitch angle (pitch angle) α can be moved during operation in order to control the rotational speed n of the rotor. Furthermore, upon reaching a rotational speed n higher than a rotational speed limit $n_{lim}$ that delimits an operational range of the wind turbine (WT), the rotor is forcibly braked by increasing the blade pitch angle α with a predefined positive blade pitch angle movement rate $\omega_r$. In this case, the predefined positive blade pitch angle movement rate is, in particular, a maximum potential positive blade pitch angle movement rate $\omega_{r,max}$.

The invention also relates to a corresponding wind turbine (WT) comprising a rotor including rotor blades, a control and/or regulating means, a rotational speed detection means in signal connection with the control and/or regulating means for ascertaining the rotational speed n of the rotor, at least one parameter setting means in signal connection with the control and/or regulating means, and a generator connected to the rotor for outputting electrical power to an electrical grid. The parameter setting means is a parameter setting means for setting a blade pitch angle α and a blade pitch angle movement rate ω of the rotor blades of the rotor.

BACKGROUND

A method of this type and a corresponding wind turbine (WT) are known. In this method the rotor of the wind turbine, upon exceeding a rotational speed limit $n_{lim}$ determined by a static rotational speed limit value, is forcible braked by increasing the blade pitch angle α ("pitch out of the wind") with a higher positive blade pitch angle movement rate, and the turbine is shut down in order to avoid significant mechanical stresses as a result of high rotational speed. During the course of forcible braking, the feeding of energy by the turbine into the electrical grid is stopped and the rotational speed is slowed significantly. In general, the turbine is in a state of spinning after braking in which no energy is fed into the grid.

After such a forcible braking the condition of the wind turbine must first be checked. The turbine, since it was shut down, must then be put back in operation. Such a restart may potentially be carried out by an operator at a remote control station. In some cases, however, this operator must be on site in order to start up the turbine. This brings with it additional costs and the restart is delayed. In any case, the energy fed by the turbine in the event of such braking is interrupted for a certain period of time.

SUMMARY

It is therefore the object of the present invention to specify a method and a wind turbine in which the aforementioned disadvantages are avoided or at least occur less frequently. At the same time, the mechanical stress resulting from high rotational speed is intended to be reduced.

The object is achieved with respect to the methods and wind turbine by the features as recited in the independent claims. Advantageous embodiments of the invention are further recited in the dependent claims.

The method according to the present invention provides that the rotational speed limit $n_{lim}$ is changed as a function of a blade pitch angle movement rate ω set by the control. In other words, the rotational speed limit $n_{lim}$ is a function of the movement rate ($N_{lim}$=f(ω)) and is raised or lowered relative to a static rotational speed limit value as a function of the blade pitch angle movement rate ω=dα/dt set by the control.

The forcible braking is not necessarily limited to a braking by increasing the blade pitch angle, but may also include an additional fraction of braking which is independent of the blade pitch angle. Such a fraction is produced, for example by a mechanical braking.

According to an advantageous embodiment of the invention, it is provided that the change in the rotational speed limit $n_{lim}$, as a function of the blade pitch angle movement rate ω set by the control, is a temporary change within a time span Δt predefined by the control. Preferably, the time span predefined by the control Δt corresponds to a maximum of double the setting time of the control, in particular, a maximum of this setting time itself. The setting time is an established control engineering term. The setting time of a control loop is the time span within which a controller (a control device) has adjusted the control variable in a tolerance range around the reference variable. The setting time is determined by the entire system of the control loop, thus, the time constants of the controller (a control and/or regulating means) as well as the control path enter into it. Alternatively, the rise time may also be used for a definition the time span Δt predefined by the control.

According to another advantageous embodiment of the invention, it is provided that the rotational speed limit $n_{lim}$ is raised and/or lowered with respect to a predefined base rotational speed threshold $n_{lim0}$ as a function of a blade pitch angle movement rate ω set by the control.

In particular, it is provided that the variable rotational speed limit $n_{lim}$ is raised with respect to the base rotational speed limit value $n_{lim0}$ to a higher predefinable rotational speed limit value $n_{lim1}$ deviating from the former, when upon reaching the base rotational speed limit value $n_{lim0}$, the blade pitch angle movement rate ω set by the control has reached or exceeded a predefined positive blade pitch angle movement rate $\omega_r$ which corresponds in particular to the blade pitch angle movement rate normally resulting during a forcible braking.

Be evaluating the statistics of forcible braking or shutdowns as a result of exceeding a fixed rotational speed limit value involving non-inventive statistical methods, it was determined that a major portion of these forcible breakings or shutdowns were unnecessary, since the control and/or regulating means of the wind turbine which controls normal operation had already initiated such operational measures, in which the forcible braking would also not have resulted in a faster return of the rotational speed n to the predefined rotational speed range, or the rotational speed n would have returned to this predefined rotational speed range within a brief time span anyway. In particular, if during normal operation the blade pitch angle α of the rotor blades was already reduced at a blade pitch angle movement rate that corresponds to the predefined positive blade pitch angle movement rate, then the forcible braking provided no time advantage.

Unlike in the case of forcible braking, which as a safety measure reduces the rotational speed independently of the actual operation and in most safety concepts results in a shutdown of the turbine, normal operation, upon reaching the normal rotational speed limit, continues with no further measures when the rotational speed limit is temporarily raised. In other words: if the control of the wind turbine (WT control) has already initiated the correct measures for reducing the rotational speed n of the rotor, namely, increasing the blade pitch angle α of the rotor blades, a shutdown could in some cases be superfluous. Correspondingly, the predefinable time span Δt within which a return of the rotational speed to the range below the normal rotational speed limit is intended to occur, ensues in the same order of magnitude as the time required by forcible braking for a return to the long-term operational range. This time span Δt lies typically in the range of between 2 s and 20 s.

On the other hand, in the case of statistical methods with fixed rotational speed limit, there are also those situations in which even before reaching the rotational speed limit which delimits the long-term operational range, it is clear that no effective reduction of the rotational speed n is achievable at the blade pitch angle movement rate ω, and that probably or most certainly forcible braking means must be employed in order to reduce the rotational speed. In such cases, another, lower rotational speed threshold limit of the operational range deviating from the rotational speed n is preferably introduced in several embodiments of the invention.

Thus, according to another advantageous embodiment of the invention, it is provided that the variable rotational speed limit $n_{lim}$ is lowered with respect to the pre-settable base rotational speed limit value $n_{lim0}$ to a predefinable rotational speed limit value $n_{lim2}$ deviating from the former when, upon reaching or exceeding a predefinable rotational speed threshold value $n_{trig}$, the blade pitch angle movement rate ω set by the control, upon reaching said lower additional rotational speed limit threshold $n_{lim2}$, remains below a predefined positive blade pitch angle movement rate $ω_r$ of the forcible braking by a predefinable amount, in particular when the blade pitch angle movement rate ω is negative or equal to zero. The rotational speed limit is lowered in particular when the blade pitch angle movement rate w set by the control results in a further reduction of the blade pitch angle α. The predefinable rotational speed threshold value $n_{trig}$ is always smaller than the base rotational speed limit value $n_{lim0}$. The predefinable rotational speed threshold value $n_{trig}$ is furthermore smaller than or at least equal to the lower predefinable rotational speed limit value $n_{lim2}$ ($n_{trig} \leq n_{lim2}$).

According to another advantageous embodiment of the invention, it is provided that the variable rotational speed limit is raised with respect to the base rotational speed limit value $n_{lim0}$ to a higher predefinable rotational speed limit value $n_{lim1}$ deviating from the former, when in accordance with an estimate, the rotational speed n returns by means of the blade pitch angle movement rate ω set by the controller to the rotational speed range below the base rotational speed limit value ($n_{lim0}$) within the predefined time constant Δt. In this case, the estimate is made by comparing current operating data of operating parameters of the WT with stored data sets of these operating parameters or by comparing current operating data of operating parameters with model data of a mathematical model of the control loop of the control.

It is further advantageously provided that the variable rotational speed limit $n_{lim}$ is also varied as a function of the temporal dissipation of the output electrical power dP/dt. The output electrical power varies strongly in particular in the event of sudden voltage drops in the grid. In this case, a partial or complete loss of generator torque occurs, which in turn results in an acceleration of the rotor. Even when measures, such as increasing the blade pitch angle, are immediately initiated via the off-line control, the result of a voltage drop is always an increase in rotational speed. Excessively high increases in rotational speed may also result in an exceedance of the pre-settable base rotational speed limit value $n_{lim0}$ and thus in a forcible braking. However, energy providers and network operators frequently demand for reasons of grid stability that WTs remain operationally ready during voltage fluctuations in the grid and that they not shut down. In an advantageous embodiment of the method according to the invention, it is therefore provided that the rotational speed limit $n_{lim0}$ be varied as function of a measured power change dP/dt ($n_{lim}$=f(dP/dt)). It is raised or lowered with respect to a pre-settable base rotational speed limit value $n_{lim0}$ as a function of the measured power change dP/dt.

In particular, it is provided that the operational range of the operation of the WT is determined by the rotational speed n of the rotor, the blade pitch angle α of the rotor blades, the corresponding blade pitch angle movement rate ω and the output power P of the generator and/or its change dP/dt.

According to a preferred embodiment of the invention, it is provided that the higher predefinable rotational speed limit value $n_{lim2}$ is a maximum of 5% above the pre-settable base rotational speed limit value $n_{lim0}$ and/or that the lower predefinable rotational speed limit value $n_{lim2}$ is a maximum of 5% below the pre-settable base rotational speed limit value $n_{lim0}$.

In conjunction with the wind turbine according to the invention, it is provided that the control and/or regulating means is adapted both to control and/or regulate the rotational speed n of the rotor using the parameter setting means and to forcibly brake the rotor by increasing the blade pitch angle α at a predefined positive blade pitch movement rate $ω_r$ according to the aforementioned method.

According to an advantageous embodiment of the invention, the control and/or regulating means includes a processor and a memory for estimating the rotational speed n of the rotor at least within a time span Δt predefined by the controller.

According to another advantageous embodiment of the invention, the control and/or regulating means includes a mathematical model of the control loop of the control.

The wind turbine also includes a brake device for braking the rotor independently of the blade pitch angle of the rotor blades, said brake device being actuated by the control and/or regulating means.

DESCRIPTION OF THE DRAWINGS

The invention is described in greater detail below with reference to the associated drawings, in which.

DETAILED DESCRIPTION

Figure 1:
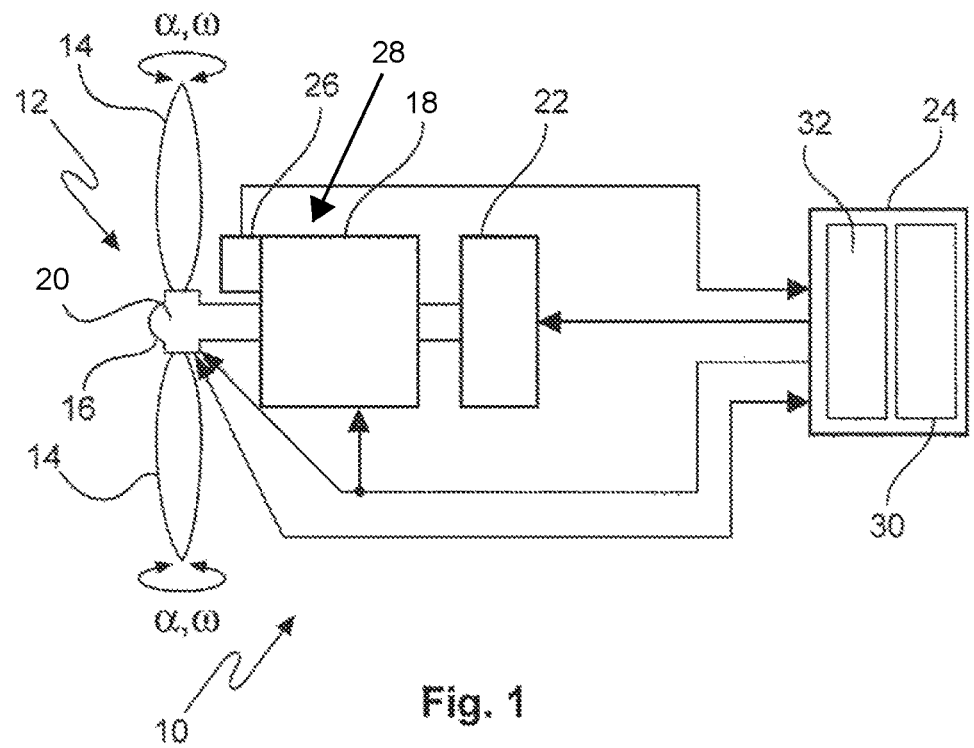
FIG. 1 shows a schematic representation of a part of a wind turbine according to a preferred embodiment of the wind turbine according to the invention.

FIG. 1 shows components of a wind turbine (WT) 10. This wind turbine includes a rotor 12 having rotor blades 14 and a generator 18 which is connected to the rotor 12 via an axle 16. A blade pitch angle α of the rotor blades 14 may be varied by means of a moving device 20. In other words, by means of this moving device 20, the rotor blades 14 may be "pitched" into and out of the wind. By "pitching out of the wind", that is, increasing the blade pitch angle α of the rotor blades 14, it is possible to brake the rotational movement of the rotor 12 and the axle 16. Thus, the moving device 20 also represents a brake device of the wind turbine.

Mounted on the axle 16 is yet another brake device 22 for braking the rotor 22 independently of the blade pitch angle α of the rotor blades 14.

To operate the wind turbine 10 multiple operating parameters may be set or varied. In this description of the principle, only one rotational speed n of the rotor 12, the aforementioned blade pitch angle α of the rotor blades, the temporal derivation dα/dt thereof, that is, the blade pitch angle movement rate ω, and a power P output by generator 18 are named by way of example as parameters.

The wind turbine 10 also includes a control and/or regulating means 24 for operating the wind turbine 10. This control and/or operating means 24 are used to set the operating parameters n, α, ω, P for the operation of the turbine 10. The wind turbine 10 further includes a rotational speed detection means 26 in signal connection with the control and/or regulating means 24 for detecting the rotational speed n of the rotor 12, and multiple parameter setting means 28 in signal connection with the control and/or regulating means 24 for adjusting the operating parameters of the normal operation. The parameter setting means 28 are, in this case, the generator 18 and the moving device 20. With the aid of this moving device 20, the blade pitch angle α may be set by the control and/or regulating means 24. The speed of this setting is determined by the corresponding blade pitch angle ω=dα/dt. This is also set by the control and/or regulating means 24. At the same time, the moving device 24 outputs a signal, on the basis of which the control and/or regulating means 24 is able to verify or verifies the adjacent blade pitch angle α as well as the blade pitch angle movement rate ω. The setting speed of the moving device 20 is limited by its respective maximum blade pitch angle adjustment rates $\omega_{max}, \omega_{max,r}$. To brake the rotor 12, the blade pitch angle α is increased. Increasing the blade pitch angle with ω=dα/dt always results in a positive blade pitch angle movement rate ω.

As the control and/or regulating means 24 receives signals from the rotational speed detection means 26 and from the moving device 20, it outputs control signals to the parameter setting means 28 (generator 18 and moving device 20) and, as the case may be, to the brake device 22 as well. The control and/or regulating means 24 includes a processor 30 and a data memory 32. The memory 32 is used to store and to read out parameter sets, the processor 30 is used to compare current operating data of the operating parameters with stored data sets. Alternatively or in addition, a mathematical model of the control loop of the control is established with the aid of the processor 30 and the memory 32.

The wind turbine 10 is operated in such a way that the rotor 12, at a rotational speed n above a rotational speed limit $n_{lim}$ which delimits an operational range 34, 34', 34" of the wind turbine 10, is forcibly braked by increasing the blade pitch angle α with a predefined positive blade pitch angle movement rate $\omega_r$, said rotational speed limit $n_{lim}$ being varied as a function of a blade pitch angle moving rate ω set by the control. This occurs preferably in increments, as shown in FIG. 2.

Figure 2:
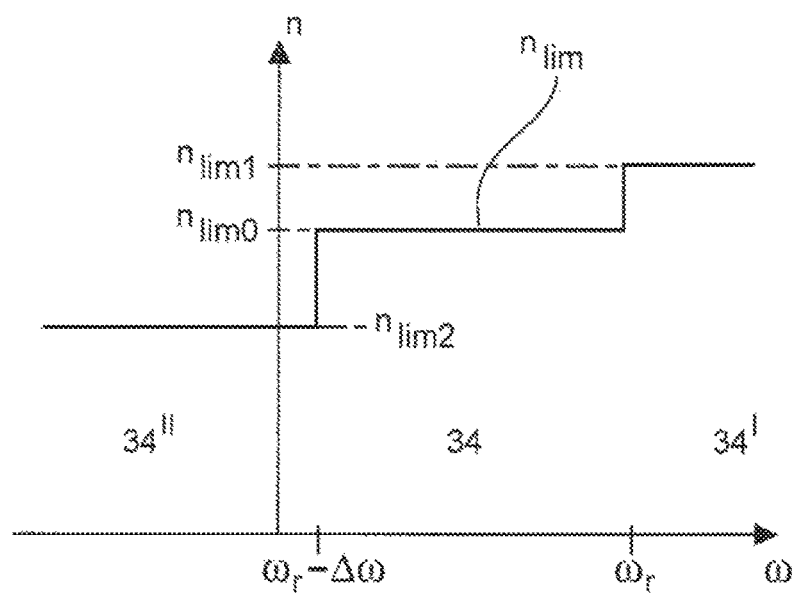
FIG. 2 shows a diagram which illustrates the dependency of the rotational speed limit of the blade pitch angle movement rate according to a preferred embodiment of the method according to the invention.

FIG. 2 shows a set rotational speed limit $n_{lim}$ as a function of the blade pitch angle movement rate ω set by the control with the aid of the control and/or regulating means, in the case of such a rotational speed limit $n_{lim}$ as a function of the blade pitch angle movement rate ω set by the control in a diagram. This results in three magnitudes of the operational range 34, 34', 34". A positive blade pitch angle movement rate in the range of $\omega_r > x \; \omega_r - \Delta\omega$ results in a base rotational speed limit value $n_{lim0}$ as the rotational speed limit $n_{lim}$ of a long term operational range 34. The upper limit $\omega_r$ of the blade pitch angle movement rate ω of this long term operational range 34 resulting during forcible braking is the predefined positive blade pitch angle movement rate $\omega_r$. The lower limit of the blade pitch angle movement rate ω of this long term operational range 34 is a blade pitch angle movement rate $\omega_r - \Delta\omega$ which falls by a predefined amount Δω below the predefined positive blade pitch angle movement rate $\omega_r$.

The variable rotational speed limit $n_{lim}$ is raised with respect to the base rotational speed limit value $n_{lim0}$ to a higher predefinable rotational speed limit $n_{lim1}$ deviating from the former, when upon reaching said higher additional rotational speed limit the blade pitch angle movement rate ω set by the control has reached or exceeded the predefined positive blade pitch angle movement rate $\omega_r$ of the forcible braking. This results in an expanded operational range 34', whose higher rotational speed limit value $n_{lim1}$ is shown on the left side of the diagram.

On the other hand, when upon reaching or exceeding a predefinable rotational speed threshold value $n_{trig}$ (not shown here), the blade pitch angle movement rate ω set by the control remains by a predefinable amount Δω below the predefined positive blade pitch angle movement rate $\omega_r$ of the forcible braking, the variable rotational speed limit is lowered with respect to the predefinable base rotational speed limit value $n_{lim0}$ to a lower predefinable rotational speed limit value $n_{lim2}$ deviating from the former. This results in a reduced operational range 34" whose lower rotational speed limit value $n_{lim1}$ is shown on the right side of the diagram.

In addition to the change of the rotational speed limit $n_{lim}$ as a function of the blade pitch angle movement rate ω set by the control, said rotational speed limit $n_{lim}$ may also be changed as a function of other variables, in particular operating variables. The variable rotational speed limit $n_{lim}$ may, for example, also be changed as a function of the temporal dissipation of the electrical power dP/dt output by the generator 18.

If normal operational measures previously initiated to reduce the rotational speed n indicate a return to the long-term operational range 30 within a predefinable time span Δt, then the higher additional rotational speed limit $n_{lim1}$ of the expanded operational range 34' deviating from rotational speed n is temporarily introduced. Upon introduction of the expanded operational range 34', the rotor 12 is temporarily (for a predefinable period of time) stopped by forcible braking with the aid of the brake device 20, only at a rotational speed n of the rotor 12 above the higher additional rotational speed limit value $n_{lim1}$ which delimits the expanded operational range 34' of the wind turbine 12 [sic–10]. The return to the long-term operational range 30 is detected, in particular, based on an evaluation of a comparison between the current operating parameters n, α, ω, P or at least a portion of said parameters and the stored parameter sets. Said parameter sets are associated with corresponding advance evaluations relating to a short-term return to the long term operational range and/or with respect to a long term departure from the long term operational range, and are also stored. In the expansion of the operational range 30, the higher additional rotational speed limit value $n_{lim1}$ is introduced even before the current rotational speed n has reached the base rotational speed limit value $n_{lim0}$ Detection of the return to the long term operational range 34 or a detection of a departure from the long term operational range 34 is accomplished, in particular, based on an evaluation of a comparison between the current operating parameters and the parameter sets stored in the data memory 32. Said parameter sets are associated with corresponding advance evaluations relating to a short-term return to the long term operational range 34 and/or with respect to a long term departure from the long term operational range 34, and are also stored.

Figure 3:
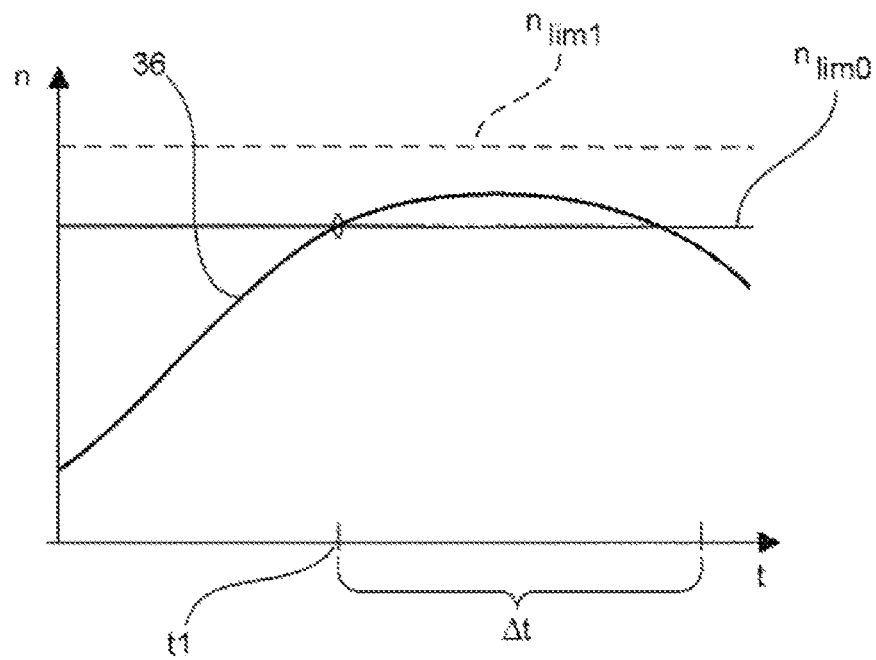
FIG. 3 shows a diagram in which a rotational speed curve in an operating situation is illustrated, in which a higher additional rotational speed limit of the operational range is appropriately introduced.

FIG. 3 exemplifies in a diagram the situation in which the expansion of the operational range 34, in which a rotational speed curve 36 is shown in an operating situation, in which a higher additional rotational speed limit value $n_{lim1}$ of the expanded operational range 34' is appropriately introduced. In the expansion of the operational range 34 to the expanded operational range 34', the higher additional rotational speed value limit $n_{lim1}$ is introduced even before reaching the base rotational speed limit value $n_{lim0}$ delimiting the long term operational range at point in time t1. Base on the evaluation, the control and/or regulating means recognized that the operating measures previously initiated for reducing the rotational speed n indicated a return to the long term operational range 34 within the predefined time span Δt. Had the higher additional rotational speed limit $n_{lim1}$ been exceeded in the predefined time span Δt, then this would have resulted in a forcible braking. In the case shown, the prognosis of the rotation speed curve was correct.

Figure 4:
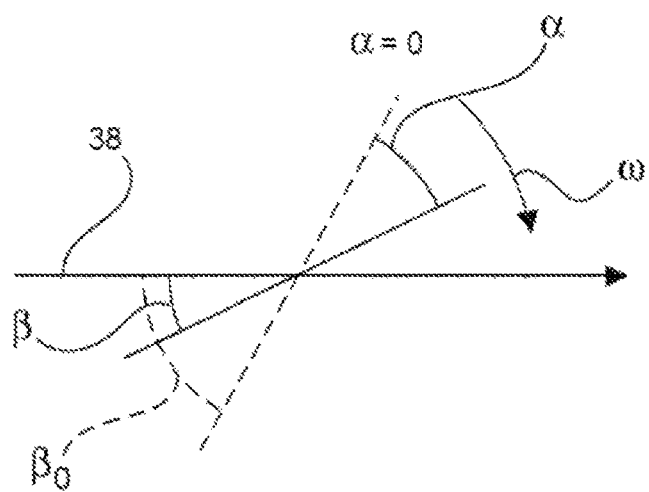
FIG. 4 shows a schematic representation which illustrates the connection between the blade pitch angle and the angle of attack of the rotor blades.

FIG. 4 shows the connection between the blade pitch angle (pitch angle) α and the attack angle β of the rotor blades 14 relative to the wind (arrow 38). In this case, the zero position of the blade pitch angle (α=0°) is defined in general in conjunction with an optimum flow position in low wind. Said zero position of the blade pitch angle α=0° corresponds to an attack angle $β_0$ of finite size which, in the present case, is arbitrarily chosen for purposes of illustration as a 60° angle. A "turning out of the wind" or "pitching out of the wind" starting from said angle $β_0$ is equivalent to reducing the attack angle β or to increasing the blade pitch angle α. Accordingly, the sign of the blade pitch angle movement rate ω=dα/dt is precisely the reverse of the sign of the attack angle movement rate dβ/dt.

LIST OF REFERENCE NUMERALS 10 wind turbine
12 rotor
14 rotor blade
16 axle
18 generator
20 moving device
22 brake device
24 control and/or regulating means
26 rotational speed detection means
28 parameter setting means
30 processor
32 data memory
34 operational range
34' expanded operational range
34" reduced operational range
36 rotational speed curve
38 arrow
α blade pitch angle
ω blade pitch angle movement rate
β attack angle

The invention claimed is:

1. A method for operating a wind turbine having a rotor, a moving device, a control and/or operating means having a processor, and a generator connected to the rotor for outputting electrical power to an electric grid, wherein the rotor includes rotor blades, whose blade pitch angle is moveable by the moving device for the purpose of controlling the rotational speed of the rotor during operation of the wind turbine, and wherein the control and/or operating means are in communication with the moving device and configured to set and adjust a positive blade pitch angle movement rate for the rotor, the method comprising:

using the control and/or operating means to set a predefined positive blade pitch angle movement rate;

using the control and/or operating means to receive a first signal indicative of the rotor rotating at a rotational speed above a rotational speed limit delimiting an operational range of the wind turbine; and upon receipt of the first signal by the control and/or operating means, using the control and/or operating means to instruct the moving device to increase the blade pitch angle of the rotor at the predefined positive blade pitch angle movement rate, characterized in that the rotational speed limit is changed by the control and/or operating means as a function of a current blade pitch angle movement rate set by the control and/or operating means.

2. The method of claim 1, characterized in that the rotational speed limit is raised and/or lowered with respect to a predefined base rotational speed limit value as a function of the current blade pitch angle movement rate set by the control and/or operating means.

3. The method of claim 2, characterized in that the change of the rotational speed limit as a function of the blade pitch angle movement rate set by the control and/or operating means is a temporary change within a time span predefined by the control and/or operating means, wherein the method further comprises:

following the predefined time span, using the control and/or operating means to instruct the moving device to return the rotational speed limit of the rotor to the predefined base rotational speed limit value.

4. The method of claim 3, further comprising:

using the control and/or operating means to determine a higher predefined rotational speed limit value deviating from the base rotational speed limit value; and using the control and/or operating means to raise the rotational speed limit with respect to the base rotational speed limit value to the higher predefined rotational speed limit value when an estimated rotational speed decreases below the base rotational speed limit value within the predefined time span by means of the blade pitch angle movement rate, wherein the control and/or operating means comprises a mathematical model of a control loop for the wind turbine, the estimated rotational speed being determined by the control and/or operating means based upon:
a comparison of current operating data of operating parameters of the wind turbine with data sets of said operating parameters that are stored by a memory of the control and/or operating means; or
a comparison of current operating data of operating parameters of the wind turbine with model data of the mathematical model of the control loop of the control and/or operating means.

5. The method of claim 2, further comprising using the control and/or operating means to raise the rotational speed limit with respect to the base rotational speed limit value to a higher predefined rotational speed limit value deviating from the base rotational speed limit value when upon reaching the base rotational speed limit value the blade pitch angle movement rate set by the control and/or operating means has reached or exceeded the predefined positive blade pitch angle movement rate.

6. The method of claim 2, characterized in that the rotational speed limit is lowered with respect to the base rotational speed limit value to a lower predefined rotational speed limit value deviating from the base rotational speed limit value when the blade pitch angle movement rate set by the control and/or operating means, upon reaching or exceeding a predefined rotational speed threshold value, remains a predefined amount below the predefined positive blade pitch angle movement rate.

7. The method of claim 6, further comprising:
using the control and/or operating means to determine a higher predefined rotational speed limit value deviating from the base rotational speed limit value; and
using the control and/or operating means to raise the rotational speed limit with respect to the base rotational speed limit value to the higher predefined rotational speed limit value when an estimated rotational speed decreases below the base rotational speed limit value within the predefined time span by means of the blade pitch angle movement rate, wherein the control and/or operating means comprises a mathematical model of a control loop for the wind turbine, the estimated rotational speed being determined by the control and/or operating means based upon:
a comparison of current operating data of operating parameters of the wind turbine with data sets of said operating parameters that are stored by a memory of the control and/or operating means, or
a comparison of current operating data of operating parameters of the wind turbine with model data of the mathematical model of the control loop of the control and/or operating means.

8. The method of claim 2, further comprising:
using the control and/or operating means to determine a higher predefined rotational speed limit value deviating from the base rotational speed limit value; and
using the control and/or operating means to raise the rotational speed limit with respect to the base rotational speed limit value to the higher predefined rotational speed limit value when an estimated rotational speed decreases below the base rotational speed limit value within the predefined time span by means of the blade pitch angle movement rate, wherein the control and/or operating means comprises a mathematical model of a control loop for the wind turbine, the estimated rotational speed being determined by the control and/or operating means based upon:
a comparison of current operating data of operating parameters of the wind turbine with data sets of said operating parameters that are stored by a memory of the control and/or operating means, or
a comparison of current operating data of operating parameters of the wind turbine with model data of the mathematical model of the control loop of the control and/or operating means.

9. The method of claim 1, characterized in that the rotational speed limit is also changed as a function of a temporal dissipation of an output electrical power provided by the generator.

10. The method of claim 1, characterized in that the operational range of the wind turbine is determined by the control and/or operating means based upon one or more parameters selected from the group consisting of: the rotational speed of the rotor, the blade pitch angle of the rotor blades, the corresponding blade pitch angle movement rate, a power output of the generator, a temporal dissipation of the power output of the generator, and combinations thereof.

11. A wind turbine comprising:
a rotor having rotor blades,
a control and/or operating means comprising a processor and a memory in communication with the processor,
a rotational speed detection means in signal connection with the processor of the control and/or operating means for ascertaining the rotational speed of the rotor,
at least one parameter setting means in signal connection with the processor of the control and/or operating means for setting a blade pitch angle and a blade pitch movement rate of the rotor blades,
a moving device configured to move the rotor blades at the blade pitch angle for the purpose of controlling the rotational speed of the rotor during operation of the wind turbine, and
a generator connected to the rotor for outputting electrical power to an electrical grid, characterized in that the control and/or operating means is in communication with the moving device and adapted to:
set a predefined positive blade pitch angle movement rate;
receive a first signal indicative of the rotor rotating at a rotational speed above a rotational speed limit delimiting an operational range of the wind turbine;
upon receipt of the first signal, instruct the moving device to increase the blade pitch angle of the rotor at the predefined positive blade pitch angle movement rate; and
change the rotational speed limit as a function of a current blade pitch angle movement rate set by the control and/or operating means.

12. The wind turbine of claim 11, characterized in that the processor of the control and/or operating means is configured to estimate the rotational speed of the rotor at least within a time span predefined by the control and/or operating means.

13. The wind turbine of claim 12, characterized in that the control and/or operating means includes a mathematical model of a control loop of the control and/or operating means for the wind turbine.

14. The wind turbine according to claim 13, further comprising a brake device for braking the rotor independently of the blade pitch angle of the rotor blades, the brake device also being actuated by the control and/or operating means.

15. The wind turbine according to claim 12, further comprising a brake device for braking the rotor independently of the blade pitch angle of the rotor blades, the brake device also being actuated by the control and/or operating means.

16. The method of claim 1, wherein the predefined positive blade pitch angle movement rate corresponds to a maximum achievable blade pitch angle movement rate for the rotor.

17. A method for operating a wind turbine having a rotor, a moving device, a control and/or operating means having a processor, and a generator connected to the rotor for outputting electrical power to an electric grid, wherein the rotor includes rotor blades, whose blade pitch angle is moveable by the moving device for the purpose of controlling the rotational speed of the rotor during operation of the wind turbine, and wherein the control and/or operating means are in communication with the moving device and configured to set and adjust a positive blade pitch angle movement rate for the rotor, the method comprising:

using the control and/or operating means to set a predefined positive blade pitch angle movement rate;

using the control and/or operating means to receive a first signal indicative of the rotor rotating at a rotational speed above a rotational speed limit delimiting an operational range of the wind turbine;

upon receipt of the first signal by the control and/or operating means, using the control and/or operating means to instruct the moving device to increase the blade pitch angle of the rotor at the predefined positive blade pitch angle movement rate, characterized in that the rotational speed limit is changed by the control and/or operating means as a function of a current blade pitch angle movement rate set by the control and/or operating means, characterized in that the rotational speed limit is raised and/or lowered with respect to a predefined base rotational speed limit value as a function of the current blade pitch angle movement rate set by the control and/or operating means; and;

using the control and/or operating means to raise the rotational speed limit with respect to the base rotational speed limit value to a higher predefined rotational speed limit value deviating from the base rotational speed limit value when upon reaching the base rotational speed limit value the blade pitch angle movement rate set by the control and/or operating means has reached or exceeded the predefined positive blade pitch angle movement rate.

* * * * *